United States Patent [19]
Schütz et al.

[11] Patent Number: 5,577,883
[45] Date of Patent: Nov. 26, 1996

[54] GAS FRICTION VACUUM PUMP HAVING A COOLING SYSTEM

[75] Inventors: Günter Schütz, Köln; Markus Szirmay; Peter Reimer, both of Hürth, all of Germany

[73] Assignee: Leybold Aktiengesellschaft, Germany

[21] Appl. No.: 356,294

[22] PCT Filed: Jun. 1, 1993

[86] PCT No.: PCT/EP93/01368
§ 371 Date: Feb. 10, 1995
§ 102(e) Date: Feb. 10, 1995

[87] PCT Pub. No.: WO94/00694
PCT Pub. Date: Jan. 6, 1994

[30] Foreign Application Priority Data

Jun. 19, 1992 [DE] Germany ............... 42 20 015.6
Nov. 11, 1992 [DE] Germany ............... 42 37 972.5

[51] Int. Cl.⁶ ................................. F04D 19/04
[52] U.S. Cl. ............................... 415/90; 415/177
[58] Field of Search ............................. 415/90, 177

[56] References Cited

U.S. PATENT DOCUMENTS

| | | | |
|---|---|---|---|
| 4,904,155 | 2/1990 | Nagaoka et al. | 415/177 X |
| 4,926,648 | 5/1990 | Okumura et al. | 415/90 |
| 4,929,151 | 5/1990 | Long et al. | 415/90 |
| 5,190,438 | 3/1993 | Taniyama et al. | 415/90 |

FOREIGN PATENT DOCUMENTS

| | | | |
|---|---|---|---|
| 0197238 | 1/1986 | European Pat. Off. | |
| 2757599 | 6/1979 | Germany. | |
| 212395 | 12/1982 | Japan | 415/90 |
| 204982 | 10/1985 | Japan | 415/90 |
| 13796 | 1/1987 | Japan | 415/90 |
| 465124 | 12/1968 | Switzerland. | |

OTHER PUBLICATIONS

Journal of Vacuum Science and Technology, Enosawa, H., "High Throughput Tandem Turbomolecular Pump for Extreme High Vacuum" May (1990).
Patent Abstracts of Japan, vol. 16, No. 458 (M-1315) 24. Sep. 1992 and A, 41 64 188 (Hitachi) Jun. 9, 1992.

Primary Examiner—Edward K. Look
Assistant Examiner—Michael S. Lee
Attorney, Agent, or Firm—Harris Beach & Wilcox, LLP

[57] ABSTRACT

The invention relates to a gas friction pump with a high vacuum (HV) area and a forevacuum area (FV) area; in order to avoid, on the pumping surfaces, the formation of solid materials when such pumps are used for chemical processes, it is proposed that the HV area and the FV area have different working temperatures, so that the temperature of the HV area is lower than the temperature of the FV area (FIG. 1).

11 Claims, 3 Drawing Sheets

GAS FRICTION VACUUM PUMP HAVING A COOLING SYSTEM

BACKGROUND OF THE INVENTION

Vacuum pumps which are operated at high rotor speeds are, for example, turbo vacuum pumps (axial, radial) or molecular pumps, turbomolecular pumps in particular. Molecular pumps, turbomolecular pumps or combinations of these, belong to the class of gas friction pumps. The active pumping surfaces of a molecular pump are formed by the surfaces of a rotor and a starer which face each other, whereby the rotor and/or the stator is equipped with a thread-like structure. Turbomolecular pumps exhibit—much like turbines—rotor and starer blades which form the active pumping surfaces. The active pumping surfaces on the inlet side form the high vacuum (HV) area. The active pumping surfaces close to the ejection side represent the forevacuum (FV) area. In combined gas friction pumps a turbomolecular pump will generally be employed in the HV area whereas a molecular pump will be used in the FV area.

Gas friction pumps of the aforementioned kind are suited for the generation of a high vacuum (from $10^3$ mbar and less). They require a backing pump, a rotary vane pump, for example, which is connected to the FV area.

Pumps of the aforementioned kind are being employed more and more for the evacuation of chambers and vessels in which chemical processes such as coating or etching etc. are run. In such applications, relatively large quantities of gas are produced which must be removed by the gas friction pump in order to maintain the required vacuum pressures. Large quantities of gas present a great thermal lead to the active pumping surfaces. Also the drive motor and the rotor bearings—be they rolling bearings or magnetic bearings—contribute to the generation of heat. Also the process gas itself may be warm in the examples given. For these reasons, gas friction pumps employed in connection with chemical processes must be equipped with a cooling system in a manner which is basically known.

SUMMARY OF THE INVENTION

In the applications outlined above, there exists the problem of solids which must be handled by the gas friction pump. The formation and deposition of solids may occur due to chemical reactions between the constituents of the gas which is pumped, by reactions between the gas and the active pumping surfaces and/or by catalytic effects. The deposition of solids leads to the formation of layers, which particularly in the case of a vacuum pumps with very narrow slits soon results in a narrowing of these slits, so that the pumping characteristics of the pump are impaired. Also abrasions, reductions in play etc. will occur, combined with increased wear resulting in a much reduced service life for the pump.

A tandem turbomolecular pump is known from the *Journal of Vacuum Science and Technology*, No. 3, May 1990, pages 2768–2771. This pump is composed of two turbomolecular pumps arranged above each other. The turbomolecular pump on the high vacuum side is equipped on its forevacuum side with a cooler.

The present invention is based on the task of designing a gas friction pump of the aforementioned kind so that the described problems of solid depositions when operating the pump in connection with chemical process are mostly removed.

This task is solved by equipping the FV side of the pump with a heater so that different operating temperatures for the HV area and the FV area are created in such a way that the temperature of the HV area is lower.

In contrast to the way in which turbomolecular pumps are commonly operated, where the pump is cooled from the FV side, the operating temperature of the pump on the FV side will be higher than the temperature on the HV side. This measure is based on the knowledge that lower temperatures in the HV area will not facilitate the formation of solids owing to the low pressure. It is of significance that the active pumping surfaces in the FV area be warmer than those in the HV area, since the formation of solids is facilitated at increasing pressures and reducing temperatures. As the temperature increases besides the pressure in gas friction pumps designed according to this invention no, or hardly any unwanted solids, can form or be deposited with the gas friction pump.

Because especially in the case of magnetically suspended gas friction pumps, the motor and its bearings only insignificantly contribute to any thermal loading of the vacuum pump, it is of particular advantage to provide a heater in the forevacuum area which can be used to maintain the desired relatively high operating temperatures in this area. All that must be done, is to ensure that the upper temperature limits for the components in the FV area such as motor, magnet material, rolling bearings, rotor blades (resistance to centrifugal forces) etc. are not exceeded. Only if excessively high temperatures occur in the FV area will it be necessary to provide a means of cooling the FV area. The effect of this cooling arrangement must be so moderate that the desired temperature profile is maintained in the sense of the present invention.

In order to meet this goal, it may, moreover, be advantageous to provide thermal resistance between the HV area and the FV area of a gas friction pump designed according to this invention. The introduction of this thermal resistance will limit spillage of the cooling effect for the HV area to the FV area so that the desired relatively high temperatures in the FV area can be maintained. If cooling means are provided for the HV area and at the same time heating means are provided for the FV area, the thermal resistance will prevent an unwanted equalization of the temperatures and will thus ensure that the temperature gradient is maintained in an economic way.

Usually a converter which is equipped with a power section, a control section and controls belongs to the vacuum pumps of the kind dealt with (see EU-A-464 571, for example). The power section comprises, among other things, a transformer which transforms or converts the main voltage to the voltage required by the drive motor. Vacuum pump and converter are linked by a cable.

A further solution provided by the present invention is, that the transformer which is employed to power the drive motor is attached in the area of the exhaust of the vacuum pump. The initial advantage of this is a size reduction for the converter by about 50 percent. The transformer may be attached to the vacuum pump in such a way that already existing spaces are utilized, so that the diameter or the height of the pump is not, or only insignificantly, increased. A further advantage is, that the heat generated by the transformer can be utilized to heat the exhaust side of the pump so that the active pumping surfaces in the FV area are warmer than those in the HV area. Because of this, the temperature as well as the pressure will increase from the inlet to the exhaust of a gas friction pump designed according to this invention so that no, or hardly any undesirable solid deposits will form in the pump. In particular, in the case of pumps in which the rotor is magnetically suspended and where the motor and its bearings only insignificantly contribute to the thermal loading of the pump, the implementation of this invention is of great importance. All that must be done is to ensure that the upper temperature limits for the components in the FV area such as motor, magnet material, rolling bearings, rotor blades (resistance to centrifugal forces) etc. are not exceeded.

If there is the likelihood of excessively high temperatures occurring in the FV area, it is then of advantage to provide additional cooling means in such a way that the FV area is cooled from the direction of the HV area. The effect of this cooling arrangement must be so moderate that the desired temperature profile is maintained in the sense of this invention.

BRIEF DESCRIPTION OF THE DRAWINGS

Further advantages and details of the present invention will become apparent from the following description taken in conjunction with the examples in drawing FIGS. 1 to 3.

Shown in

Drawing

DETAILED DESCRIPTION OF THE INVENTION

Figure 1:
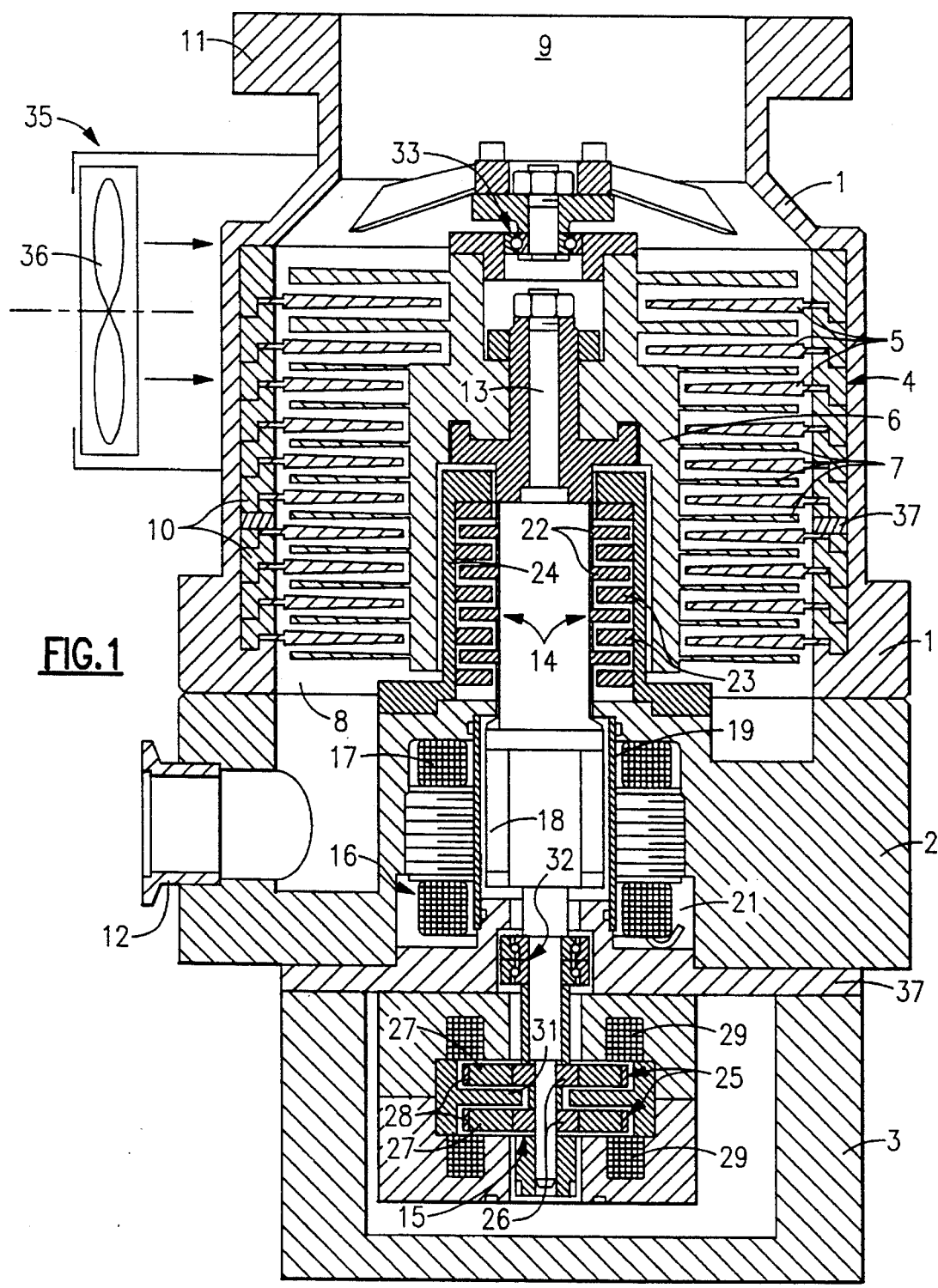
FIG. 1 is a turbomolecular pump with air cooling designed according to the present invention, Drawing
Figure 2:
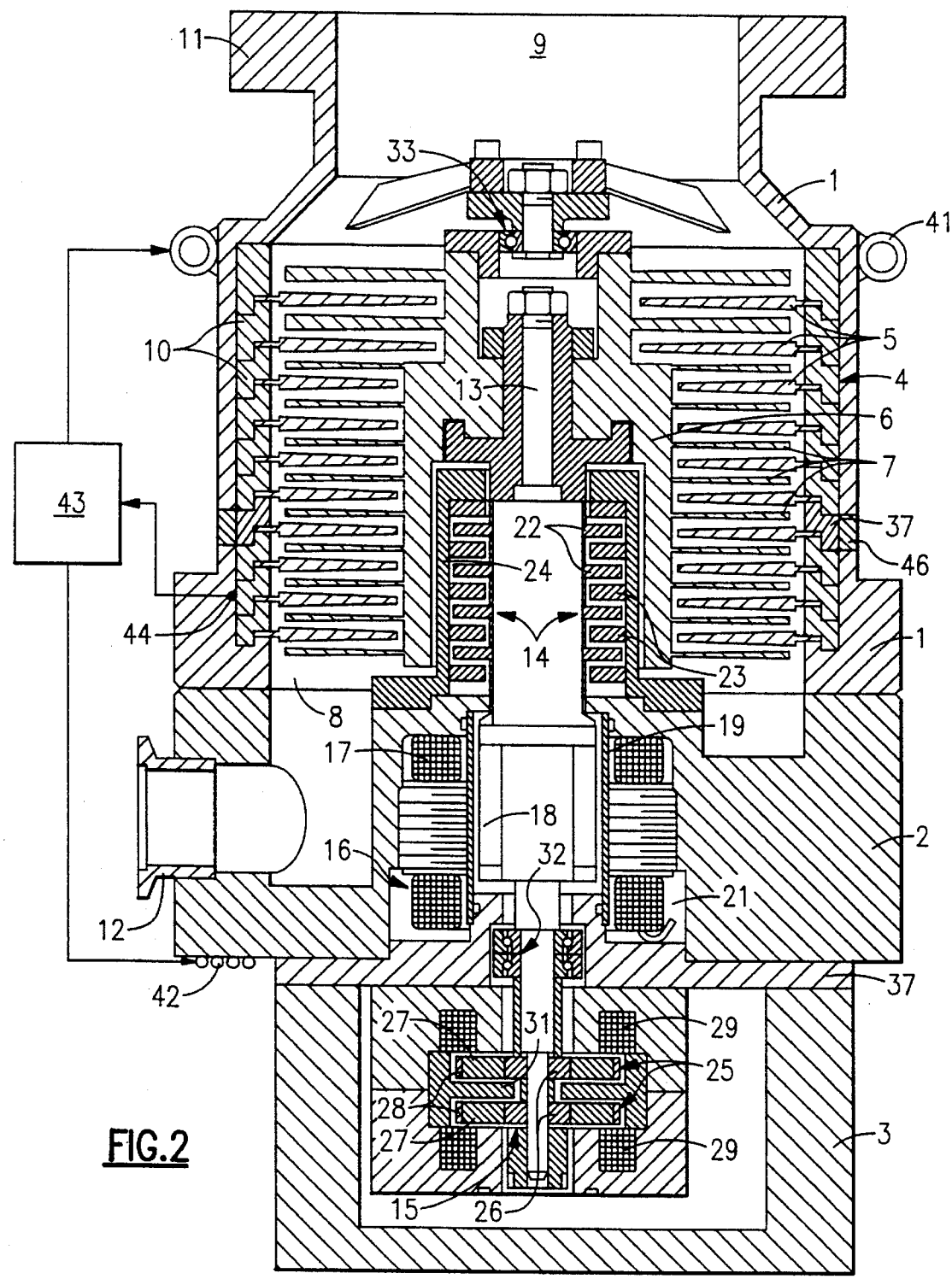
FIG. 2 is a turbomolecular pump with a liquid cooling system and Drawing
Figure 3:
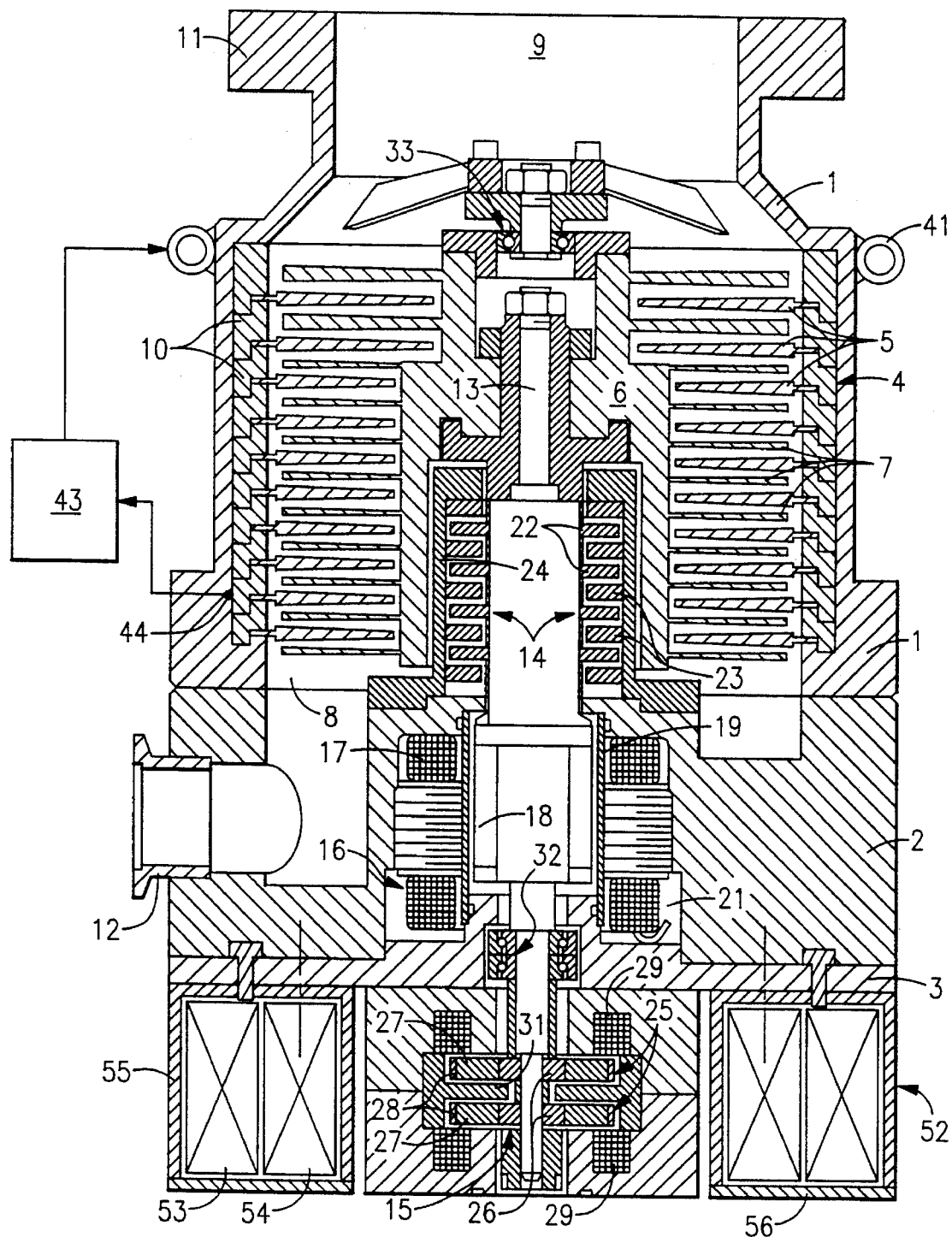
FIG. 3 is a section through a turbomolecular pump with a converter.

The turbomolecular pump shown in drawing FIGS. 1 to 3 comprises housing section 1 as well as basic sections 2 and 3. The housing section 1 surrounds stator 4. The stator 4 consists of several spacing rings 10 between which the stator blades 5 are held in place. The stator blades 5 as well as the rotor blades 7 which are attached to rotor 6 are arranged in interleaved rows and form the ring-shaped gas supply channel 8. The gas supply channel 8 connects the inlet 9 of the pump (inlet side, HV area) which is formed by connection flange 11 to the outlet 12, to which a backing pump is normally connected (exhaust side, FV area).

The rotor 6 is attached on to a shaft 13 which in turn is supported by magnetic bearings 14 and 15 in the housing of the pump. Drive motor 16 which is located between the two magnetic bearings 14 and 15, is formed by coil 17 and armature 18 which rotates together with the shaft 13. The drive motor 16 is a canned motor.

The can of the motor which is located between coil 17 and armature 18 is marked by number 19. The coil 17 is located in a space 21 formed by the can of the motor and housing section 2, whereby this space 21 is not accessible to the gases pumped by pump 1.

The upper magnetic bearing 14 is designed as a passive magnetic bearing. It consists of rotating ring discs 22 which are attached to the shaft 13, and fixed ring discs 23 which are surrounded by bushing 24. The further magnetic bearing 15 is partly active (in the axial direction) and partly passive (in the radial direction). In order to achieve this ring discs 25 are attached to shaft 13 which in turn each consist of hub ring 26, a permanent magnetic ring 27 and a strengthening ring 28. It is the task of strengthening rings 27 to prevent destruction of the permanent magnetic rings 27 due to the strong centrifugal forces which occur.

Fixed coils 29 are related to the rotating permanent magnetic rings 27. These generate magnetic fields which can be changed by the current flowing through the coils. The current flowing through the coils is changed depending on the signal provided by axial sensors which are shown.

A fixed ring disc 31 made of a non-magnetizable material of high electrical conductivity is located in the slit between ring discs 25 which rotate together with the shaft. This material stabilizes the bearing by means of highly effective eddy current damping. A bearing the design of which corresponds to that for magnetic bearing 15, has been published in European Patent 155 624.

The turbomolecular pump shown in drawing FIG. 1 is equipped with air cooling system 35. Blower 36 is part of this air cooling system. The flow of cooling air generated by blower 36 is only directed on to the HV area of the pump shown. Therefore, the desired cooling is only effective in this area. The flow of cooling area first cools the HV section of housing 1 and thus the HV section of starer 4 in housing 1.

Rotor 6 with its rotor blades 7 is cooled by thermal radiation. The cooling effect reduces in the direction of the FV side so that during operation higher temperatures will prevail there compared to the HV area.

If, for example, housing 1 is made of stainless steel which does not conduct heat so well, and if the starer rings 10 are made of aluminum, a good conductor for heat, it can then be advantageous to provide thermal resistance 37. This thermal resistance is created by a ring made of a material which will not conduct heat well and it is part of the stator pack. Thermal resistance 37 thermally separates the HV side of the rotor from the FV side so that the area on the FV side of the stator may attain higher temperatures.

In the design example according to drawing FIG. 1, the cross section of thermal resistance 37 takes the shape of a simple ring. The shape of is cross section is augmented by further rings so that starer ring 10 results. Even a complete stator ring 10 may be made of thermally insulating material thereby forming thermal resistance 37 (see drawing FIG. 2). Finally, it is possible to apply a thermally insulating layer to the face of a stator ring for the purpose of forming the thermal resistance.

In the design example according to drawing FIG. 2, the turbomolecular pump which is shown, is equipped on the HV side with a cooling pipe 41, which is attached to housing 1 by means of soldering or welding. During operation, a suitable refrigerant (water, for example) is allowed to flow through pipe 41. At the same time, a heater 42 is provided on the FV side to heat the FV side to the desired elevated temperature. Control system 43 which is only schematically shown is provided for maintaining a controlled temperature gradient from the FV side to the HV side. This system controls the temperature or the amount of refrigerant flowing through cooling pipe 41 and/or the current applied to heater 42 depending on the signals supplied by one or several temperature sensors. One sensor 44 is shown. This sensor is employed to monitor the temperature in the FV area which should be as high as possible but within the temperature limits derailed above.

In the design example according to drawing FIG. 2 also housing 1 is equipped with thermal resistance 46 at about the same height as thermal resistance 37 for the stator. This measure is required when housing 1 is made of a material which conducts heat well, like aluminum, for example. This effectively provides a thermal separation between the FV side and the HV side. If required, also rotor 6 and bushing 24 of magnetic bearing 14 may be equipped with thermal barriers (represented by broken lines).

A converter which is not shown comprising a power section, a control section as well in general also subassemblies for operation of the pump belong to the turbomolecular pump of the aforementioned kind. According to the present invention, transformer 52 which otherwise is part of the converter, is attached to the pump at base flange 3 on the exhaust side. The transformer 52 (with primary coil 53 and secondary coil 54) is ring-shaped (toroidal type) and is located in a housing 55 which serves the purpose of interference shielding and which protects the user form accessing voltage carrying parts. The transformer 52 is accessible via the lower cover 56 of housing 55.

Housing 55 is also ring-shaped, surrounds the magnetic bearing 15 which protrudes from base flange 3 and its outside diameter approximately corresponds to the diameter of housing section 2 of the pump. This only insignificantly changes the dimensions of the pump, whereas the volume of the converter which is not shown is considerably reduced.

Housing 55 is made of a material which conducts heat very well and it is attached to base flange 3 by means of screws. Thus the heat produced in the transformer may easily pass on the FV side of the pump thereby causing the desired temperature increase.

If, in the case of other applications, this temperature increase in the FV area should not be desired then a ring disc which is not shown made of a thermally insulating material may be fitted between the base flange 3 and housing 35.

It is of importance that in the applications mentioned above both pressure and temperature increase as the gas passes through the pump. Therefore, it may be of advantage to cool the HV area of the pump. Cooling pipe 41 is shown as an example. Cooling the FV area is also possible in order to be able to quickly control the temperatures in this area.

Control system 43 which is only shown schematically is provided for maintaining a certain temperature gradient in a controlled manner. This control system controls the temperature or the amount of refrigerant flowing through cooling pipe 41 depending on the signals supplied by one or more temperature sensors. One sensor 44 is shown. This sensor is employed to monitor the temperature in the FV area which should be as high as possible while at the same time keeping within the limits detailed above.

I claim:

1. A gas friction pump that includes a high vacuum section and a forevacuum (FV) section contained within a housing, a cooling means for cooling the HV section, and a heating means for heating the FV system whereby the temperature of the HV section is maintained at a lower level than that of the FV section during operation of said pump.

2. The pump according to claim 1 further including a high speed rotor and a power supply for driving said rotor further includes a transformer for providing heat energy to the heating means.

3. The pump according to claim 2 wherein said transformer is annular in form and encircles the FV section of the housing.

4. The pump according to claim 3 wherein said transformer is releasably attached to a base flange mounted on said pump housing.

5. The pump of claim 4 wherein said transformer is mounted in a transformer housing made of a heat conductive material whereby heat is efficiently transferred to the FV section.

6. The pump of claim 1 that further includes insulating means for separating the HV and FV sections.

7. The pump according to claim 1 wherein said cooling means is an air cooling system.

8. The pump according to claim 7 further including a control means and temperature sensor means that cooperate to regulate the operation of the cooling means and the heating means.

9. The pump according to claim 1 further including a stator unit containing a stator unit containing a plurality of spacing rings.

10. The pump according to claim 9 where at least one of the stator spacing rings contains a material having high resistance to the transfer of heat.

11. The pump according to claim 9 further including a bearing bushing and wherein the housing, the stator, the rotor and said bushing are formed from a heat resistant material.

* * * * *